United States Patent
Wolfe et al.

(10) Patent No.: US 9,417,753 B2
(45) Date of Patent: Aug. 16, 2016

(54) METHOD AND APPARATUS FOR PROVIDING CONTEXTUAL INFORMATION BETWEEN OPERATING SYSTEM ENVIRONMENTS

(75) Inventors: Christopher M. Wolfe, Antioch, IL (US); Andrew N. Tzakis, Vernon Hills, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 531 days.

(21) Appl. No.: 13/462,533

(22) Filed: May 2, 2012

(65) Prior Publication Data
US 2013/0298141 A1 Nov. 7, 2013

(51) Int. Cl.
*G06F 9/44* (2006.01)
*G06F 3/0481* (2013.01)
*G06F 9/445* (2006.01)
*G06F 3/048* (2013.01)
*G06F 9/455* (2006.01)

(52) U.S. Cl.
CPC .... *G06F 3/048* (2013.01); *G06F 8/61* (2013.01); *G06F 9/4443* (2013.01); *G06F 9/45533* (2013.01)

(58) Field of Classification Search
None
See application file for complete search history.

(56) References Cited

U.S. PATENT DOCUMENTS

| | | |
|---|---|---|
| 5,119,494 A | 6/1992 | Garman |
| 5,446,904 A | 8/1995 | Belt et al. |
| 5,592,657 A | 1/1997 | Johnson et al. |
| 5,757,371 A | 5/1998 | Oran et al. |
| 5,828,376 A | 10/1998 | Solimene et al. |
| 6,043,816 A | 3/2000 | Williams et al. |

(Continued)

FOREIGN PATENT DOCUMENTS

| | | |
|---|---|---|
| CN | 101025701 A | 8/2007 |
| CN | 101051282 A | 10/2007 |

(Continued)

OTHER PUBLICATIONS

Nekhelesh Ramananthan; Ubuntu for Android: The Complete Story; Feb. 2012; http://www.muktware.com/2012/02/ubuntu-for-android-the-complete-story/2253; 5 pages.*

(Continued)

*Primary Examiner* — H S Sough
*Assistant Examiner* — Kimberly Jordan
(74) *Attorney, Agent, or Firm* — McDermott Will & Emery LLP (57) ABSTRACT

A method includes providing data and associated contextual information, to a first operating system environment by a second operating system environment, both operating system environments utilizing a common kernel. The data is utilized by the first operating system environment, based on the contextual information. The method may include installing the data as an application file, using the contextual information to understand that the data is an application file. An apparatus that performs the method includes a programmable processor, and memory containing executable instructions. The processor runs multiple operating system environments utilizing a common kernel. The second operating system environment is operative to provide data and contextual information for the data, to the first operating system environment, and the first operating system environment is operative to utilize the data based on the contextual information.

20 Claims, 5 Drawing Sheets

(56) References Cited

U.S. PATENT DOCUMENTS

| | | |
|---|---|---|
| 6,133,915 A | 10/2000 | Arcuri et al. |
| 6,167,425 A | 12/2000 | Beckhoff |
| 6,170,045 B1 | 1/2001 | Bobak et al. |
| 6,178,503 B1 | 1/2001 | Madden et al. |
| 6,205,452 B1 | 3/2001 | Warmus et al. |
| 6,215,490 B1 | 4/2001 | Kaply |
| 6,336,120 B1 | 1/2002 | Noddings et al. |
| 6,336,146 B1 | 1/2002 | Burridge et al. |
| 6,338,149 B1 | 1/2002 | Ciccone, Jr. et al. |
| 6,460,136 B1 | 10/2002 | Krohmer et al. |
| 6,571,282 B1 | 5/2003 | Bowman-Amuah |
| 6,691,146 B1 | 2/2004 | Armstrong et al. |
| 6,710,788 B1 | 3/2004 | Freach et al. |
| 6,757,002 B1 | 6/2004 | Oross et al. |
| 6,763,458 B1 | 7/2004 | Watanabe et al. |
| 7,114,104 B1 | 9/2006 | Bennett |
| 7,328,333 B2 | 2/2008 | Kawano et al. |
| 7,363,128 B2 | 4/2008 | Dietsch et al. |
| 7,424,601 B2 | 9/2008 | Xu |
| 7,424,623 B2 | 9/2008 | Du et al. |
| 7,461,144 B1 * | 12/2008 | Beloussov ............ G06F 9/5055 707/999.202 |
| 7,468,729 B1 | 12/2008 | Levinson |
| 7,523,738 B2 | 4/2009 | Ruiz |
| 7,529,921 B2 | 5/2009 | Stein et al. |
| 7,533,101 B2 | 5/2009 | Bond et al. |
| 7,536,537 B2 | 5/2009 | Linn |
| 7,590,945 B2 | 9/2009 | Sims et al. |
| 7,595,810 B2 | 9/2009 | Louch |
| 7,634,770 B2 | 12/2009 | Roth |
| 7,636,586 B2 | 12/2009 | Maaniitty |
| 7,681,134 B1 | 3/2010 | Grechishkin et al. |
| 7,689,820 B2 | 3/2010 | Pierce et al. |
| 7,783,665 B1 | 8/2010 | Tormasov et al. |
| 7,882,274 B2 | 2/2011 | Peterson |
| 7,975,236 B1 | 7/2011 | Grechishkin et al. |
| 8,046,570 B2 | 10/2011 | King et al. |
| 8,177,554 B2 | 5/2012 | Krasner |
| 8,195,624 B2 | 6/2012 | Yang |
| 8,261,231 B1 | 9/2012 | Hirsch et al. |
| 8,307,177 B2 | 11/2012 | Prahlad et al. |
| 8,352,733 B2 | 1/2013 | Mantere et al. |
| 8,392,498 B2 | 3/2013 | Berg et al. |
| 8,396,807 B1 | 3/2013 | Yemini et al. |
| 8,448,251 B2 | 5/2013 | Harris et al. |
| 8,589,952 B2 | 11/2013 | Wong et al. |
| 8,661,360 B2 | 2/2014 | Jeong et al. |
| 8,868,899 B2 | 10/2014 | Galicia et al. |
| 8,957,905 B2 | 2/2015 | Reeves et al. |
| 8,983,536 B2 | 3/2015 | Gangam et al. |
| 2001/0035882 A1 | 11/2001 | Stoakley et al. |
| 2002/0078260 A1 | 6/2002 | Hart et al. |
| 2002/0140742 A1 | 10/2002 | Lection et al. |
| 2002/0151334 A1 | 10/2002 | Sharma |
| 2002/0157001 A1 | 10/2002 | Huang et al. |
| 2003/0065738 A1 | 4/2003 | Yang et al. |
| 2003/0135771 A1 | 7/2003 | Cupps et al. |
| 2003/0204708 A1 | 10/2003 | Hulme et al. |
| 2003/0221087 A1 | 11/2003 | Nagasaka |
| 2004/0015966 A1 | 1/2004 | MacChiano et al. |
| 2004/0039950 A1 | 2/2004 | Okamoto et al. |
| 2004/0061723 A1 | 4/2004 | Tai et al. |
| 2004/0066414 A1 | 4/2004 | Czerwinski et al. |
| 2004/0095388 A1 | 5/2004 | Rocchetti et al. |
| 2004/0111644 A1 | 6/2004 | Saunders et al. |
| 2004/0148375 A1 | 7/2004 | Levett et al. |
| 2004/0205755 A1 | 10/2004 | Lescouet et al. |
| 2004/0207508 A1 | 10/2004 | Lin et al. |
| 2005/0086650 A1 | 4/2005 | Yates et al. |
| 2005/0108297 A1 | 5/2005 | Rollin et al. |
| 2005/0125739 A1 | 6/2005 | Thompson et al. |
| 2005/0229188 A1 | 10/2005 | Schneider |
| 2005/0240756 A1 | 10/2005 | Mayer |
| 2005/0240763 A9 | 10/2005 | Bhat et al. |
| 2005/0246505 A1 | 11/2005 | McKenney et al. |
| 2005/0268078 A1 | 12/2005 | Zimmer et al. |
| 2006/0005187 A1 | 1/2006 | Neil |
| 2006/0010314 A1 | 1/2006 | Xu |
| 2006/0010446 A1 | 1/2006 | Desai et al. |
| 2006/0026274 A1 | 2/2006 | Cho et al. |
| 2006/0046706 A1 | 3/2006 | Lin et al. |
| 2006/0146057 A1 | 7/2006 | Blythe |
| 2006/0224989 A1 | 10/2006 | Pettiross et al. |
| 2006/0225107 A1 | 10/2006 | Seetharaman et al. |
| 2006/0253706 A1 | 11/2006 | Roberts et al. |
| 2007/0050765 A1 | 3/2007 | Geisinger |
| 2007/0128899 A1 | 6/2007 | Mayer |
| 2007/0135043 A1 | 6/2007 | Hayes et al. |
| 2007/0150842 A1 | 6/2007 | Chaudhri et al. |
| 2007/0162298 A1 | 7/2007 | Melton et al. |
| 2007/0180398 A1 | 8/2007 | McArdle |
| 2007/0192329 A1 | 8/2007 | Croft et al. |
| 2007/0198656 A1 | 8/2007 | Mazzaferri et al. |
| 2007/0226647 A1 | 9/2007 | Louch |
| 2007/0266231 A1 | 11/2007 | Chua |
| 2007/0283147 A1 | 12/2007 | Fried et al. |
| 2007/0288941 A1 | 12/2007 | Dunshea et al. |
| 2007/0294689 A1 | 12/2007 | Garney |
| 2008/0028326 A1 | 1/2008 | Wilson et al. |
| 2008/0034318 A1 | 2/2008 | Louch et al. |
| 2008/0082815 A1 | 4/2008 | Kawano et al. |
| 2008/0100568 A1 | 5/2008 | Koch et al. |
| 2008/0114844 A1 | 5/2008 | Sanchez et al. |
| 2008/0162983 A1 | 7/2008 | Baba et al. |
| 2008/0256468 A1 | 10/2008 | Peters et al. |
| 2008/0270910 A1 | 10/2008 | Lukasik et al. |
| 2008/0276195 A1 | 11/2008 | Moromisato et al. |
| 2008/0282205 A1 | 11/2008 | Dykstra-Erickson et al. |
| 2008/0307350 A1 | 12/2008 | Sabatelli et al. |
| 2008/0307360 A1 | 12/2008 | Chaudhri et al. |
| 2009/0031329 A1 | 1/2009 | Kim |
| 2009/0037909 A1 | 2/2009 | Xu |
| 2009/0063845 A1 | 3/2009 | Lin |
| 2009/0064186 A1 | 3/2009 | Lin |
| 2009/0080562 A1 | 3/2009 | Franson |
| 2009/0089569 A1 | 4/2009 | Baribault et al. |
| 2009/0158299 A1 | 6/2009 | Carter |
| 2009/0193074 A1 | 7/2009 | Lee |
| 2009/0199122 A1 | 8/2009 | Deutsch et al. |
| 2009/0199219 A1 | 8/2009 | Rofougaran et al. |
| 2009/0235200 A1 | 9/2009 | Deutsch et al. |
| 2009/0241072 A1 | 9/2009 | Chaudhri et al. |
| 2009/0276771 A1 | 11/2009 | Nickolov et al. |
| 2009/0287571 A1 | 11/2009 | Fujioka |
| 2009/0327917 A1 | 12/2009 | Aaron et al. |
| 2009/0328033 A1 | 12/2009 | Kohavi et al. |
| 2010/0064251 A1 | 3/2010 | Hufnagel et al. |
| 2010/0077347 A1 | 3/2010 | Kirtane et al. |
| 2010/0097386 A1 | 4/2010 | Kim et al. |
| 2010/0107115 A1 | 4/2010 | Sareen et al. |
| 2010/0138515 A1 | 6/2010 | Ruiz-Velasco et al. |
| 2010/0192149 A1 | 7/2010 | Lathrop et al. |
| 2010/0211769 A1 | 8/2010 | Shankar et al. |
| 2010/0217912 A1 | 8/2010 | Rofougaran et al. |
| 2010/0245037 A1 | 9/2010 | Davis et al. |
| 2010/0313156 A1 | 12/2010 | Louch et al. |
| 2010/0313165 A1 | 12/2010 | Louch et al. |
| 2010/0319008 A1 | 12/2010 | Ho |
| 2010/0333088 A1 | 12/2010 | Rogel et al. |
| 2010/0333100 A1 | 12/2010 | Miyazaki et al. |
| 2011/0016299 A1 | 1/2011 | Galicia et al. |
| 2011/0016301 A1 | 1/2011 | Galicia et al. |
| 2011/0022993 A1 | 1/2011 | Ohno et al. |
| 2011/0054879 A1 | 3/2011 | Bogsanyl et al. |
| 2011/0055602 A1 | 3/2011 | Kamay et al. |
| 2011/0066984 A1 | 3/2011 | Li |
| 2011/0093691 A1 | 4/2011 | Galicia et al. |
| 2011/0093836 A1 | 4/2011 | Galicia et al. |
| 2011/0119610 A1 | 5/2011 | Hackborn et al. |
| 2011/0126216 A1 | 5/2011 | Galicia et al. |
| 2011/0138295 A1 | 6/2011 | Momchilov et al. |
| 2011/0138314 A1 | 6/2011 | Mir et al. |
| 2011/0144970 A1 | 6/2011 | Jiang et al. |
| 2011/0179387 A1 | 7/2011 | Shaffer et al. |

(56) References Cited

U.S. PATENT DOCUMENTS

| | | |
|---|---|---|
| 2011/0246786 A1 | 10/2011 | Laor et al. |
| 2012/0036450 A1 | 2/2012 | Canton |
| 2012/0041570 A1 | 2/2012 | Jones et al. |
| 2012/0042159 A1 | 2/2012 | Liu |
| 2012/0081353 A1 | 4/2012 | Yusupov et al. |
| 2012/0081380 A1 | 4/2012 | Reeves et al. |
| 2012/0084542 A1 | 4/2012 | Reeves et al. |
| 2012/0084791 A1 | 4/2012 | Benedek et al. |
| 2012/0102495 A1 | 4/2012 | Gangam et al. |
| 2012/0150970 A1 | 6/2012 | Peterson et al. |
| 2012/0151372 A1 | 6/2012 | Kominac et al. |
| 2012/0173741 A1* | 7/2012 | Brittain ............ G06F 17/30893 709/228 |
| 2012/0173986 A1 | 7/2012 | Jung |
| 2012/0174021 A1 | 7/2012 | Dharawat |
| 2012/0192100 A1 | 7/2012 | Wang et al. |
| 2012/0227058 A1 | 9/2012 | Hunt et al. |
| 2012/0278747 A1 | 11/2012 | Abraham et al. |
| 2012/0278750 A1 | 11/2012 | Abraham et al. |
| 2012/0304092 A1 | 11/2012 | Jarrett et al. |
| 2013/0160013 A1 | 6/2013 | Pires et al. |
| 2013/0212283 A1 | 8/2013 | Wang et al. |
| 2013/0293573 A1 | 11/2013 | Wolfe |
| 2013/0298140 A1 | 11/2013 | Wolfe |
| 2013/0311682 A1 | 11/2013 | Barat et al. |

FOREIGN PATENT DOCUMENTS

| | | |
|---|---|---|
| CN | 101149685 | 3/2008 |
| CN | 101203842 A | 6/2008 |
| CN | 101382833 A | 3/2009 |
| CN | 101615123 A | 12/2009 |
| CN | 101697181 A | 4/2010 |
| EP | 157783 A1 | 10/1985 |
| EP | 1059582 A2 | 12/2000 |
| EP | 1688816 A1 | 8/2006 |
| GB | 2369959 A | 6/2002 |
| JP | H 07-121336 A | 5/1995 |
| JP | 2005-242445 A | 9/2005 |
| JP | 2007-034600 A | 2/2007 |
| JP | 2009-157802 A | 7/2009 |
| RU | 2005136419 A | 5/2007 |
| RU | 2331160 C2 | 8/2008 |
| WO | WO-03/027876 A1 | 4/2003 |
| WO | WO-2005/043862 A1 | 5/2005 |
| WO | WO-2007/035611 A2 | 3/2007 |
| WO | WO-2010/148306 A1 | 12/2010 |
| WO | 2011060382 A1 | 5/2011 |
| WO | WO-2012/012865 A1 | 2/2012 |
| WO | WO-2012/148881 A1 | 11/2012 |
| WO | WO-2012/148885 A1 | 11/2012 |

OTHER PUBLICATIONS

Android Central Forums; Getting Started with Android—Tips and Tricks; Sep. 2010; http://forums.androidcentral.com/general-help-how/31622-getting-started-android-tips-tricks.html; excerpted 41 pages.*

Ryan Whitwam; Everything You Need to Know About Ubuntu for Android; Feb. 22, 2012; http://www.tested.com/tech/android/3627-everything-you-need-to-know-about-ubuntu-for-android/; 5 pages.*

Bob Dormon; Motorola Atrix Lapdock; Aug. 19, 2011; http://www.theregister.co.uk/Print/2011/08/19/accessory_of_the_week_motorola_atrix_lapdock/; 8 pages.*

Webtop Application; archived Apr. 29, 2011; 6 pages.*

Parallels: Parallels Workstation, http://www.parallels.com/products/workstation/, (downloaded Dec. 28, 2012), all pages.

The Sun Babefish Blog, "Why Apple Spaces is Broken", Nov. 8, 2007, 24 pages, blogs.oracle.com/bblfish/entry/why_apple_spaces_is_broken.

Ryan Paul: Canonical developers aim to make Android apps run on Ubuntu, http://arstechnica.com/gadgets/2009/05/canonical-developers-aim-to-make-android-apps-run-on-ubuntu/, May 26, 2009, all pages.

Casadevall, et al., "Android Execution Environment," retrieved from <https://wiki.ubuntu.com/Specs/AndroidExecutionEnvironment>, Apr. 28, 2009, 5 pages.

Codecoffee, "How to compile & execute C programs under Linux (Absolute basics)," Oct. 2009, retrieved from http://www.codecoffee.com/tipsforlinux/articles/18.html.

Maker, "A Survey on Android vs Linux," University of California 2009, pp. 1-10.

Meier "Professional Android 2 Application Development," Aug. 2010, retrieved from http://esys.ir/files/ref_books/android/esys.ir_professional%20android%202%20application%20development.pdf.

Wikipedia "Comparison of X Window System desktop environment," Jan. 2009, retrieved from http://en.wikipedia.org/wiki/Comparison_of_X_Window_System_desktop_environments.

Wikipedia "GNU C Library," Nov. 2009, retrieved from http://en.wikipedia.org/wiki/GNU_C Library 4 pages.

Wikipedia "POSIX," Apr. 2009, retrieved from http://en.wikipedia.org/wiki/POSIX, 5 pages.

Wikipedia "Taskbar" retrieved from http://en.wikipedia.org/wiki/Taskbar dated Feb. 24, 2010; 7 pages.

Wikipedia "X Window System," Jan. 2009, retrieved from http://en.wikipedia.org/wiki/X_window_system, 11 pages.

Martin: iTunes 9.0.2 Improves App Sorting, http://reviews.cnet.com/8301-19512_7-10387022-233.html?tag=contentMain;contentBody;1n, Oct. 2009, 5 pages.

Herrman: VMWare for Mobile Devices Lets yuou Run Windows and Android Simultaneously, http://gizmodo.com/5160685/vmware-for-mobile-devices-lets-you-run-windows-and-android-simultaneously/all, Feb. 2009, 2 pages.

An Overview of Virtulization Techniques, Jun. 4, 2009 www.virtuatopia.com/index.pjp/AnOverview_of_Virtualization_Techniques, 4 pages.

Baentsch, "Mote Runner: a Mu,ti-Language Virtual Machine for Small Embedded Devices," 2009 3rd International Conference on Sensor Technologies and Applications, IEEE 10 pages.

Citrix: Go ToAssist Corporate Remote Support Made Easy, www.gotoassist.com, Fact Sheet, 10.8.10/B-27141/PDF, 2010, Citrix Online LLC.

Citrix: Go ToAssist Corporate Remote Support Made Easy, www.gotoassist.com, Product Overview, 4.21.10/B-26651/PDF, 2010, Citrix Online LLC.

Citrix: Go ToAssist Express Remote Support Made Easy, www.gotoassist.com, Fact Sheet, 9.27.10/B-21307/PDF, 2010, Citrix Online LLC.

D'Sa, "Run Android apps on Windows," Nov. 2011, http://tech2.in.com/how-to/apps/run-android-apps-on-windows/259042.

EGL 1.0 Specification, published Jul. 23, 2003.

Getting Started with VMware Fusion for Mac OS X, VMware, item EN-000189-00, copyright 2007-2009, VMware, Inc.

Hassan, "Ubiquitous Computing and Android" 3rd International Conference Digital Information Management 2008, IEEE 6 pages.

Kernel (computing) from Wikipedia http://en.wikipedia.org/wiki/Kernal_(computer_science); 18 pages, printed Jun. 5, 2009.

Kobie, "Vmware demos mobile virtualisation," Feb. 2009, http://itpro.co.uk/609992/vmware-demos-mobile-virtualisation.

Nakajima, et al., "Composition Kernel: A multicore Processor Virtualization Layer for Rich Functional Smart Products," Software Technologies for Embedded and Ubiquitous Systems, Oct. 2010, pp. 227-238.

Payne, et al. "Lares: An Architecture for Secure Active Monitoring Using Virtualization," IEEE Symposium on Security and Privacy, May 2008, pp. 233-247.

Payne, et al. "Secure and Flexible Monitoring of Virtual Machines," Computer Security Applications Conference, Dec. 2007, pp. 385-397.

Richardson, et al., "Virtual Network Computing," IEEE Internet Computing, IEEE Service Center, Jan. 1998, vol. 2, No. 1, pp. 33-38.

The Xen Team: "Users' manual Xen v 2.0 for x86" University of Cambridge, UK Dec. 31, 2004 56 pages.

Tubbs, "Windows Live Mesh 2011 and SkyDrive Synced Storage woven together nicely; still a few loose threads," posted Oct. 29,

(56) References Cited

OTHER PUBLICATIONS 2010, http://www.wysiwygmedia.com/reviews/ windows-live-mesh-2011-and-skydrive-synced-storage-woven-together-nicely-still-a-few-loose-threads.wm.

Turner, "Introducing Android 1.5 NDK, Release 1" Jun. 25, 2009 4 pages.

Ubuntu from Wikipedia http://en.wikipedia.org/wiki/ubuntu; 12 pages, printed Jun. 5, 2009.

"Ubuntu Linux Rocks!!" published Nov. 15, 2009, http://maxtheitpro.com/ubuntu-linux-rocks.

Ubuntu Mobile from Wikipedia http://en.wikipedia.org/wiki/ubuntu_mobile; 2 pages, printed Jun. 5, 2009.

Vmware: VMware Workstation 7 Product FAQs, downloaded Apr. 18, 2011.

VMware Workstation 7, the Gold Standard in Desktop Virtualization, Product Datasheet, 2009, www.vmware.com.

Windows Live Mesh, Windows Live, 2011, Microsoft.

Gelchlik, "How to Lock Your Fcomputer with Bluetooth Proximity Lock Utility," Apr. 2010, http://www.makeuseof.com/tag/lock-windows-computer-bluetooth-proximity-lock-utility/.

Mac OS X Hints, "Lock and unlock a Mac using Bluetooth detection," Dec. 2009, http://hints.macworld.com/article.php?story=20091221173111783.

Ubuntu forums, "Howto: Use BlueProximity and your cellphone for security," Feb. 2008, http://ubuntuforums.org/showthread.php?t=702372.

* cited by examiner

METHOD AND APPARATUS FOR PROVIDING CONTEXTUAL INFORMATION BETWEEN OPERATING SYSTEM ENVIRONMENTS

CROSS-REFERENCE TO RELATED APPLICATIONS

The present disclosure is related to copending U.S. patent application Ser. No. 13/462,523, filed on May 2, 2012, entitled, "METHOD AND APPARATUS FOR DISPLAYING DATA FROM A PLURALITY OF CONCURRENT OPERATING SYSTEM ENVIRONMENTS," and U.S. patent application Ser. No. 13/462,529, filed on May 2, 2012, entitled, "METHOD AND APPARATUS FOR DISPLAYING ACTIVE OPERATING SYSTEM ENVIRONMENT DATA WITH A PLURALITY OF CONCURRENT OPERATING SYSTEM ENVIRONMENTS," both of which are assigned to the same assignee as the present application, and both of which are hereby incorporated by reference herein.

FIELD OF THE DISCLOSURE

The present disclosure relates generally to operating systems and operating system environments.

BACKGROUND

Various operating systems provide features and applications that are often specific to the given operating system. For this reason, it has become useful for computing devices, including handheld mobile devices, to be capable of running more than one operating system environment. By running more than one operating system environment on a device, users are able to access the features and applications associated with each of the operating system environments, thereby enhancing the capabilities and functions of the device.

In the past, virtualization techniques have been used to accomplish running multiple operating system environments; however such approaches require emulation of an entire machine which is resource intensive. Systems have now been developed that enable actual running of multiple operating system environments without the need for such resource intensive machine emulation. Such systems utilize a common kernel where the operating system environments may be considered middleware, in that, some services related to the various applications may be supported within the confines of the environment. Therefore, in these systems, the operating system environments co-exist independently, and do not require virtualization as in the past. Devices supporting these multiple environments therefore enable users to access and enjoy the features of the operating systems and their associated data such as applications.

Nevertheless, some demarcation between the operating system environments must exist for the purpose of presentation to the device user. The environments usually provide their own unique approach to how associated data is displayed by the operating system. In some cases, the user may be compelled to switch display views in order to work with one or another operating system environment. Being forced to switch views in this manner negatively impacts user experience because the work or operating contexts in which the user was engaged can be lost or muddled among the various views. Furthermore, any given operating system environment will not understand, and therefore will be incapable of interpreting, data associated with a different operating system environment and any associated data or working context.

DETAILED DESCRIPTION

The disclosed embodiments provide better interoperability between multiple operating system environments. The embodiments include providing contextual information about data from one operating system environment to another operating system environment. As a result, the user experience in working with multiple operating system environments is enhanced. For example, a user may download an application file for a first operating system environment, using a browser application of a second operating system environment. Unlike previous systems, the user can drag-and-drop the application file from the browser of the second operating system environment, to a desktop (home screen or wallpaper, etc.) of the first operating system environment. The first operating system environment obtains contextual data so that the application file can be installed in place, and/or launched, on the display portion associated with the first operating system environment.

The embodiments disclosed provide a method which includes providing data and contextual information for the data, to a first operating system environment by a second operating system environment. Both operating system environments utilize a common kernel. The data is associated with the first operating system environment which utilizes the data based on the contextual information. The method may include installing the data as an application file by the first operating system environment, where the first operating system environment is informed that the data is the application file by the contextual information. The method may include obtaining the data associated with the first operating system environment by the second operating system environment, by downloading the data via a browser application of the second operating system environment. The data may be an application file for an executable application, a widget, a video, or any other type of data file.

The method may include moving the data, in response to user interface input, from the second operating system environment to the first operating system environment and providing the contextual information for the data in response to moving the data. For example, the user may move an icon associated with the data, using drag-and-drop selection input, cut and paste selection input, etc.

The method may also include displaying, on a display, at least one application window associated with the second operating system environment, and at least one icon, representing the data, located within the at least one application window, the icon selectable by drag-and-drop selection input, and providing the data, and the contextual information for the data, to the first operating system environment in response to drag-and-drop selection input to drag-and-drop the icon from the at least one application window to a desktop of the first operating system environment.

The embodiments include an apparatus that has at least one programmable processor, and memory operatively coupled to the programmable processor. The memory contains executable instructions, that when executed cause the programmable processor to provide a first operating system environment and at least a second operating system environment, with both operating system environments utilizing a common kernel. The second operating system environment is operative to provide data and contextual information for the data, to the first operating system environment. The first operating system environment is operative to utilize the data based on the contextual information.

The first operating system environment is also operative to utilize the data by installing the data as an application file. The first operating system environment is informed by the contextual information, that the data is the application file.

The second operating system environment is operative to obtain the data associated with the first operating system environment by downloading the data via a browser application of the second operating system environment. The data may be moved between operating system environments, in response to user interface input, from the second operating system environment to the first operating system environment which also provides the contextual information for the data in response to moving the data. The data may be moved by, for example, drag-and-drop selection input to drag-and-drop an icon associated with the data.

The apparatus may include a display, operatively coupled to the at least one programmable processor. The display is operative to display at least one application window associated with the second operating system environment, and at least one icon, representing the data, located within the at least one application window, where the icon is selectable by drag-and-drop selection input. The programmable processor is further operative to provide the data, and the contextual information for the data, to the first operating system environment in response to drag-and-drop selection input to drag-and-drop the icon from the at least one application window to a desktop of the first operating system environment.

The embodiments also include a computer readable, non-volatile, non-transitory memory, storing executable instructions for execution by at least one processor, that when executed cause the at least one processor to perform the various methods and operations of the embodiments as described above.

Figure 1:
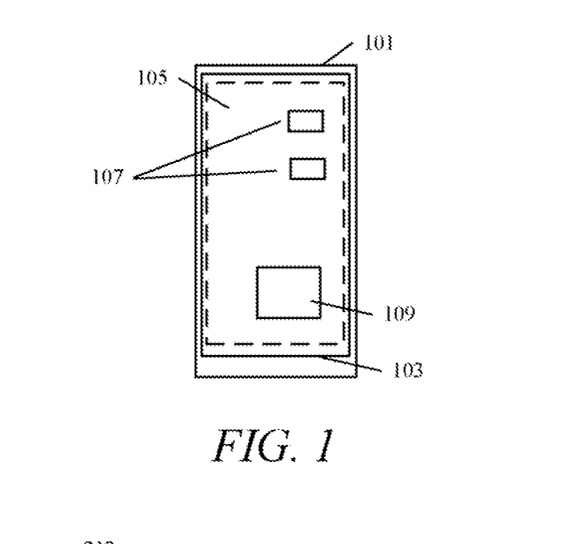
FIG. 1 is a block diagram of a mobile device display with a display image having various image content associated with a first operating system environment.

Turning now to the drawings wherein like numerals represent like components, FIG. 1 illustrates a mobile device 101, which includes an integrated display 103. The integrated display 103 may display a background image, such as live wallpaper 105, shown as a dotted line around the perimeter of the display 103. The mobile device 101 may also be capable of displaying various home screens that provide for organization of application icons 107. The home screens may allow the user to launch an application within the perimeter of the home screen, by, for example, clicking a mouse cursor on one of the desired application icons 107. Additionally, scrolling to another home screen may also allow scrolling between such launched applications. In any case, the live wallpaper 105, is associated with a first operating system environment, and may provide active image content. For example, a widget 109 may provide real time information to the user. One example of a widget 109 is a clock widget which provides the time. The home screens, and/or various visual image objects such as icon 107 or widget 109 present in a home screen, may be moved about using a graphical user interface (GUI), that may include touch screen functionality, a track ball, or any other suitable user interface for selecting and moving image objects. The background image, which may be the live wallpaper 105, remains active during any user interactions. In other words, the live wallpaper 105 may be viewed as a representation of the associated first operating system environment, which may be a Linux® based operating system environment such as, but not limited to, Android™, Ubuntu®, etc.

Figure 2:
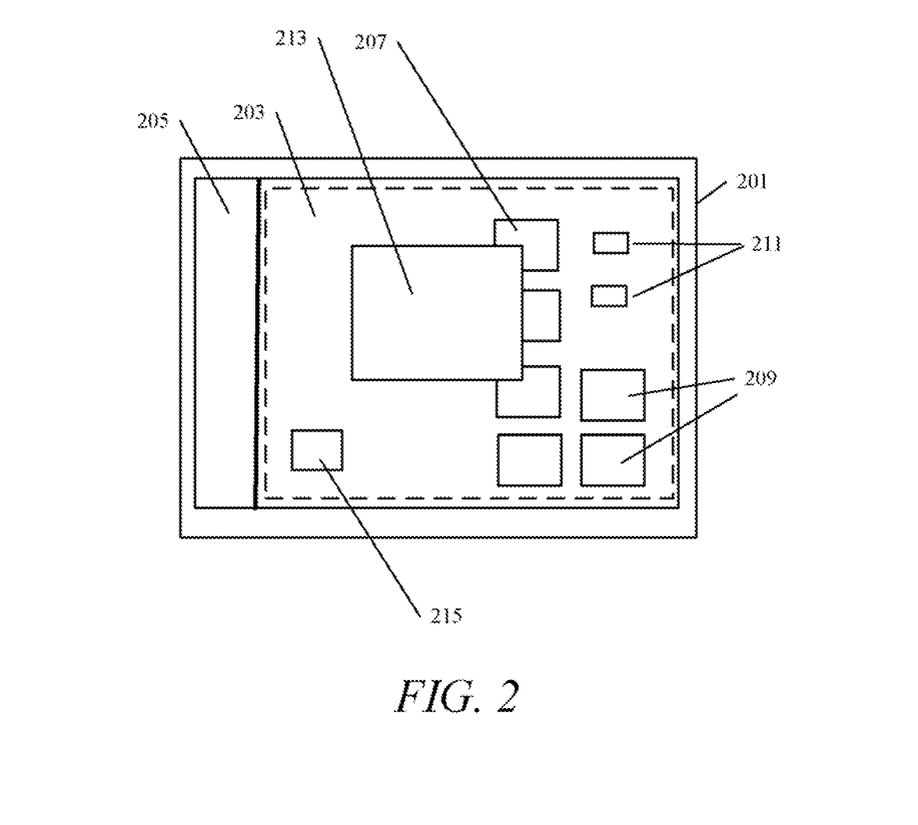
FIG. 2 is block diagram of a display having a combined image employing at least two different operating system environments concurrently.

The mobile device 101 may interact with a larger display 201 as shown in FIG. 2. The larger display 201 may provide an enhanced user experience by allowing the user of mobile device 101 to have better a better view of various applications, etc. For example, the larger display 201 may display various icons 211, widgets 207, 209, application windows 213, 215, and a toolbar 205. The display image may include a background image, referred to herein as live wallpaper 203. The live wallpaper 203 is associated with a first operating system environment of mobile device 101. Some of the image objects displayed on (or hovering over) the live wallpaper 203, may be associated with a second, third, etc., operating system environment. The mobile device 101 may use one or more operating system environments together, or launch additional operating system environments as needed. Therefore, the display 201 may display a combined image providing information from one or more operating system environments. In the example of FIG. 2, the live wallpaper 203, icons 211, and widgets 207, 209, are associated with a first operating system environment of the mobile device 101. The toolbar 205 and application window 213 and 215, are associated with a second operating system environment. The application windows 213 and 215 are overlaid on, or in other words, hover over, the live wallpaper 203 of the first operating system environment.

The term "display" as used herein refers to a device that displays "display data" to form an image or images, such as, but not limited to, a picture, a computer desktop, a gaming background, a video, an application window etc. Examples of a display include a television, computer monitor, etc., or an integrated display as found in electronic devices such as a laptop computer, handheld computing device, mobile telephone, PDA, etc. The display device may employ any appropriate display technology, such as for example, a CRT, LCD flat panel, LED flat panel, plasma screen, etc.

The terms "screen," "home screen," and "workspace" are used interchangeably in reference to an "image" which refers generally to what is "displayed" on a display. That is, an image, including a "screen," "home screen," and/or "workspace" may be displayed on a display. Examples of images include, but are not limited to, a computer desktop (i.e. a background), a gaming background, a video, an application window, an icon, a widget, etc., including also the active or live wallpaper described herein. In other words, the term "image" may refer to a background, or may refer individually, or collectively, to elements or objects in the foreground, of hovering over, a background image such as the live wallpaper.

The term "display data" is used interchangeably herein with the term "image data" and refers to the information (data, or digital information) that the display interprets and/or decodes to show (i.e. to display) the user an image such as a workspace or home screen, as well as any associated elements or objects in the foreground of home screens or workspaces, or the live wallpaper, etc.

The term "data" as used herein, and in contrast to "display data," may refer to files (i.e. data files) such as executable application files, widgets, video files, documents, photographs, etc. without limitation, or to text data, such as, for example, words copied and pasted from a document.

In the example of FIG. 2, the display 201 displays a combined image that includes display data from a first operating system environment and a second operating system environment. A live wallpaper 203 is displayed that represents the first operating system environment and is active or "live," in that, real time operating system information may be provided. In one example, an active or live widget 207, associated with the first operating system environment may provide real time information to the user. An example of an active or live widget is a clock application that provides the time. As shown in FIG. 2, an application window 213 associated with a second operating system environment may be positioned, and/or moved by the user on and about the live wallpaper 203. In the example of FIG. 2, the application window 213 is shown hovering above a live widget 207 as well as various other widgets 209 that are associated with the first operating system environment. The live widget 207 and any of the other widgets 209 that are active or "live," would remain in an active state, even if covered over by images associated with the second operating system. That is, the live widget 207 will remain active even though the application window 213 is in "focus," i.e. is active and being used, and partially (or completely) covers over the widget 207 image as shown in FIG. 2. Put another way, the first operating system environment, as represented by the live wallpaper 203, is always running behind the second (or any other) operating system environment. The second operating system environment may be interacted with through windows such as application windows 213 and 215. These windows are resizable by the user as illustrated by window 213 which is expanded versus window 215 which is shown reduced in size, on the display.

As mentioned briefly above, the mobile device 101 first operating system environment may provide various "home screens" that enable the user to organize application icons 107 and widgets 109. In other words, various icons and widgets may be distributed between various home screens. The background image, i.e. live wallpaper 105 as shown in FIG. 1, may include home screen objects (i.e. icons 107 and widget 109), that are associated with one of several home screens. The combined image displayed on display 201, will include all icons, widgets, etc., from all of the home screens. For example, icons 211 and widgets 207, 209 are shown collectively on the combined image displayed on display 201. However, if displayed on the integrated display 103 of the mobile device 101, the icons 211 and widgets 207, 209 would be distributed according to their corresponding home screens as configured by the mobile device 101 user.

The home screens of the first operating system environment may be mapped to workspaces of the second operating system environment. In this example, the live wallpaper 203, as illustrated generally by the dotted line within the perimeter of the display 201, may show a home screen of the first operating system environment. In this example, only the icons 211 and widgets 207, 209 that the user associated with the displayed home screen would be displayed. Likewise, the windows 213 and 215 may be associated with a workspace of the second operating system, and that workspace may be mapped with the given home screen. In this case, only windows for the given workspace would be shown, along with image objects for the mapped home screen. That is, the combined display may show only those image objects which the user associated with the mapped workspace/home screen. The user may switch (i.e. toggle), or scroll, away from one workspace/home screen, and back again to, for example, the workspace/home screen of the combined image shown in FIG. 2. However, in any of these examples, the live wallpaper 203 remains active. Active widgets, such as widget 207 remain fixed to the live wallpaper 203. In this case, the workspace/home screens may be viewed as hovering above the live wallpaper 203 and any fixed active widgets.

Figure 3:
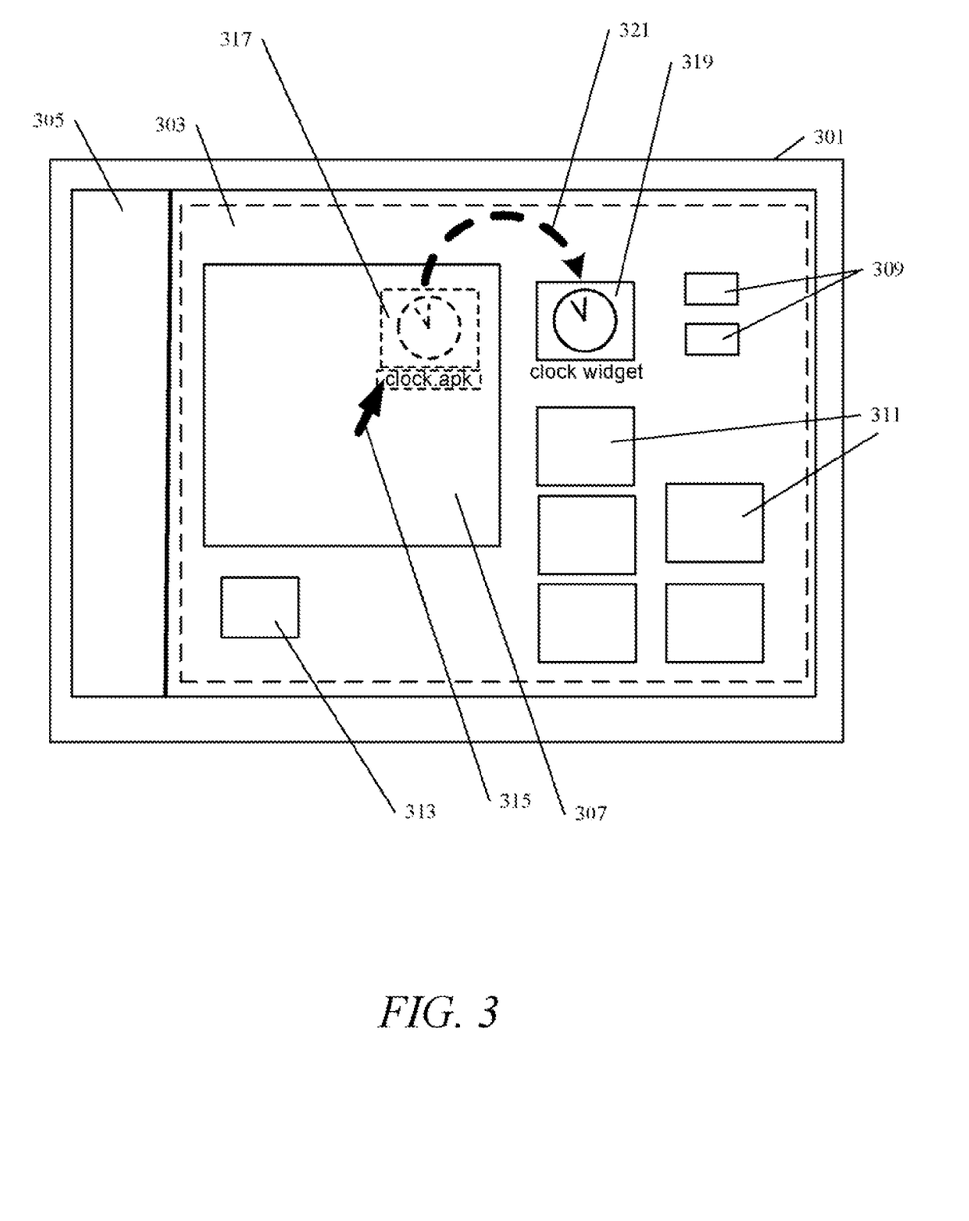
FIG. 3 is a block diagram illustrating an example of a drag-and-drop interoperability operation in accordance with the embodiments.
Figure 4:
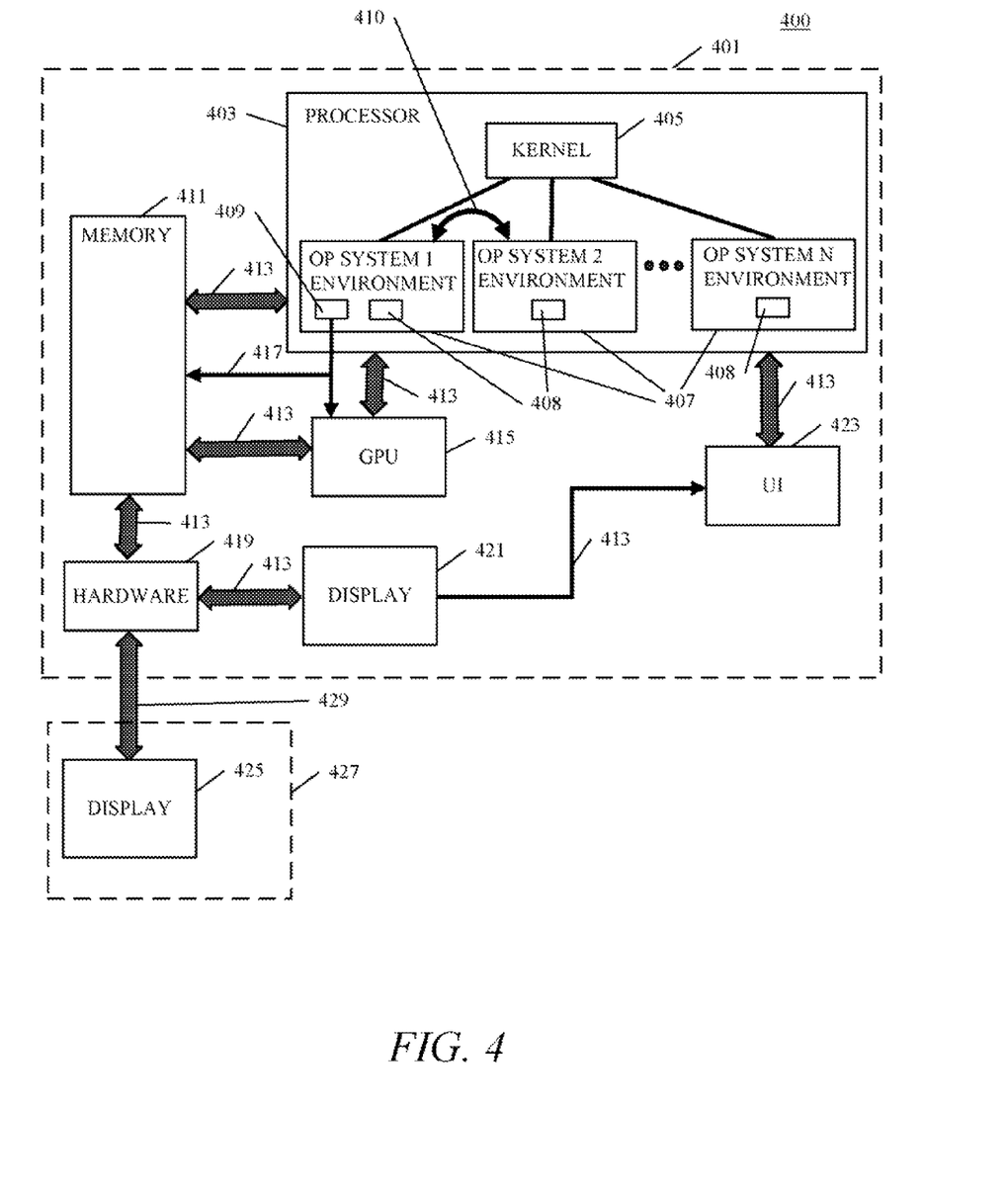
FIG. 4 is diagram of an apparatus with a plurality of operating system environments, a single kernel and interoperability logic in accordance with an embodiment.

The various embodiments are best understood with reference to FIG. 3 and FIG. 4. FIG. 3 illustrates a display 301 similar to the display illustrated in FIG. 2. That is, the display 301 provides a desktop 303 which may be live wallpaper as described above. The desktop 303 or live wallpaper may have various icons 309, widgets 311, and application windows 307, 313 positioned either upon, or hovering above, the desktop 303. For example, the desktop 303 may be associated with the first operating system environment. The application windows 307 and 313 may be associated with a second operating system environment, and may hover over the desktop 303. The icons 309 and widgets 311, may also be associated with the first operating system environment and may be fixed to the desktop 303 or may hover over it in some embodiments. A toolbar 305 may also be provided, that may be associated with either the first or second operating system environment.

In accordance with the embodiments, the application window 307 may be a browser application window, associated with the second operating system environment. Accordingly, the user may download data, such as a widget 317, using the browser application. The widget 317 in the example of FIG. 3, is a "clock.apk" file which is a clock widget associated with the first operating system environment. The user may use a mouse cursor 315, or alternatively touch screen functionality, to drag-and-drop the widget 317 icon from the browser application window 307 to the desktop 303. The dashed arrow 321 is provided in FIG. 3 to illustrate the movement of the data, (i.e. the data file represented by widget 317 icon), from the browser application window 317 to the desktop 303. By moving the widget 317 icon to the desktop 303, the first operating system environment receives contextual information informing the first operating system environment that the data is the clock widget application file (i.e. an ".apk" file). The first operating system environment will therefore, in accordance with the embodiments, install the clock widget 317 ".apk" file in place (i.e. where "dropped" onto the desktop 303) as installed clock widget 319, and launch it. In some embodiments, the first operating system environment will also launch an options window, if present in the application, to enable the user to select options or set preferences, accordingly.

Examples of contextual information include, but are not limited to, location on the display screen where data is dropped (such as by a drag-and-drop operation), a file extension, meta data, etc. In other words, contextual information provides information related to data (such as text, a file, etc.) to an operating system environment, such that the operating system environment is enabled to take appropriate action related to the data. In the clock widget 319 example discussed above, the second operating system environment may provide to the first operating system environment, as the contextual information, the ".apk" file extension, a pixel location on the desktop where the file is dropped, file meta data, and/or other information to the first operating system environment. Because a ".apk" file extension is a file type associated with the first operating system environment, the first operating system environment will accordingly treat the data provided by the second operating system environment as an installable ".apk" file. Additionally, the first operating system environment, or more specifically, the operating system environment that receives the data, may also read and interpret any other received contextual information such as metadata to determine what to do with the data. As mentioned above, the operating system environment that receives the data and contextual information may receive a pixel location on the display screen where the data is dropped. The receiving operating system environment may interpret the pixel location and determine that the data has been dropped on the desktop. By also having the contextual information informing the receiving operating system environment that the file is a ".apk" file, the receiving operating system environment will accordingly install the ".apk" file in place on the desktop as a widget.

Additionally, in some embodiments a receiving operating system environment may obtain the contextual information based on the activity or action that occurs between the receiving operating system environment and the sending operating system environment. For example, text that is pasted to the desktop of the receiving operating system environment may be immediately interpreted as a request to perform a search based on the text. In another example, digits cut and pasted from one operating system environment to a dialer application of a receiving operating system environment may immediately be interpreted as a request to dial the digits to establish a phone call or to send a fax. Various other examples, in accordance with the embodiments, may be envisioned by those of ordinary skill based on the description provided above.

Among the advantages of the embodiment illustrated by FIG. 3, user experience is enhanced because the user can use a desired browser of the second operating system environment to obtain applications or widgets for the first operating system environment, and install and run them in a straightforward and seamless manner by using drag-and-drop. That is, the embodiments enhance interoperability of multiple operating system environments.

FIG. 4 illustrates a block diagram of an apparatus 400 in accordance with various embodiments. For example, the apparatus 400 may include a mobile device 401 operatively connected via a communication bus 429 to a peripheral device 427 that may include a display 425. The mobile device 401 includes programmable processor 403 (i.e. a CPU) and graphics processing unit (GPU) 415, which are operatively coupled via a communication bus 413. The communication bus 413 may run throughout the mobile device 401, providing operative coupling to the various components and circuitry contained within the mobile device 401. Therefore, in accordance with embodiments, device components, circuitry, and the like, may be operatively coupled via the communication bus 413. In other words, various intervening device components, circuitry, and the like, may exist in between, and/or along, the communication path between any two or more operatively coupled components. As shown in FIG. 4, the programmable processor 403 is operatively coupled by the communication bus 413 to memory 411 and to a user interface (UI) 423. The memory 411 is in turn operatively coupled, via the communication bus 413, to hardware 419 that drives an integrated display 421. The integrated display 421 is operatively coupled to hardware 419 via the same communication bus 413. The display 421 serves as a graphical user interface (GUI) of the mobile device 401. Therefore, the display 421 also interfaces with, and is operatively coupled to, the programmable processor 403 via the communication bus 413 as part of the UI 423. The UI 423 may include a track ball mouse, touch sensitive elements, physical switches, gyroscopic position sensors, etc. The display 421 may provide a touchscreen functionality that is also therefore operatively coupled, via the communication bus 413, to the user interface 423. That is, the display 421 may provide a graphical user interface with touchscreen capability in addition to cursor control click to provide selection input and/or drag and drop input functionality.

In accordance with the embodiments, the programmable processor 403 may run various operating system environments 407, such as operating system environment 1, operating system 2 environment, and so on through an N-th operating system environment. In other words, the programmable processor 403 is operative to run one or more of the various operating system environments 407, concurrently. The plurality of operating system environments 407 are each completely autonomous and can exist and function independently from one another. One or more of the operating system environments may be run concurrently, and each operating system environment utilizes a common kernel 405. In other words, each one of the operating system environments is completely autonomous and may exist and function completely independently, without any of the other operating system environments being executed. The operating system environments provide "environments," in that, for example, all necessary libraries, toolkits, windowing, etc., is present within the environment to enable an application associated with the operating system environment to function. The common kernel 405 provides fundamental interaction at the hardware level of mobile device 401. For example, the common kernel 405 may provide required operating system tasks such as program loading, system resource allocation, handling device input and output, and some memory management functions. The common kernel 405 may be created as an object-oriented design that can interface, and enable communication with, programming objects within the various operating system environments 407.

Examples of operating system environments include, but are not limited to, Android™, Ubuntu®, other Linux® based operating systems, etc. In one example embodiment, the mobile device 401 may be connected to the peripheral device 427 by way of a docking port that provides the communication bus 429. In this example, the mobile device 401 display data may be shown on display 425 which may be larger in dimensions than the integrated display 421.

The apparatus 400 may include multi-environment display data handling logic 409. The multi-environment display data handling logic 409 may be contained within one or more of the various operating system environments 407. The multi-environment display data handling logic 409 may also exist independently from any of the operating system environments in some embodiments. However, for the example embodiment illustrated in FIG. 4, the first operating system environment is shown as including the multi-environment display data handling logic 409. The multi-environment display data handling logic 409 is operatively coupled to the memory 411 and also to the GPU 415 via communication path 417 which may be implemented over the internal communication bus 413. Therefore the communication path 417 is a schematic representation of a communication path between the multi-environment display handling logic 409 and the memory 411 and GPU 415, and may be implemented via any suitable communication pathway. That is, it is to be understood that the operating system environment that includes the multi-environment display data handling logic 409 achieves the objectives by communicating with the GPU 415 and memory 411 via the communication bus 413. The multi-environment display data handling logic 409 combines display data from at least a first operating system environment and a second operating system environment. The multi-environment display data handling logic 409 generates live wallpaper image data corresponding to the first operating system environment (i.e. op system 1 environment in FIG. 4), and handles image data from the other operating system environments as overlay image data, that hovers above the live wallpaper image. In some embodiments, the multi-environment display data handling logic 409 may also combine into a workspace of the second operating system environment, display data associated with a corresponding home screen of the first operating system environment, to achieve the combined display.

In accordance with the embodiments, one or more of the plurality of operating system environments 407 include interoperability logic 408. The interoperability logic 408 facilitates the communication of contextual information between the various operating system environments 407. For example the first operating environment may pass contextual information 410 to the second operating system environment or, vice versa, the first operating system environment may receive contextual information 410 from the second operating system environment. In some embodiments, the multi-environment display data handling logic 409 and/or the interoperability logic 408 may be object oriented software or firmware that is executed by processor 403 only when more than one operating system environment is executed by the processor 403.

The term "logic" as used herein may include software and/or firmware executing on one or more programmable processors (including CPUs and/or GPUs), and may also include ASICs, DSPs, hardwired circuitry (logic circuitry), or combinations thereof. For the example embodiment illustrated by FIG. 4, the interoperability logic 408, and also the multi-environment display data handling logic 409, may be executable instructions stored in memory 411, which is a non-volatile, non-transitory memory. Furthermore, the operating system environments 407, and the kernel 405, may also consist of executable instructions that are executed by the programmable processor 403, and that are stored in memory 411 for access by the programmable processor 403 as necessary.

Although the example provided by FIG. 4 illustrates the operating system environments, kernel 405, interoperability logic 408, and also the multi-environment display data handling logic 409 as executed by the programmable processor 403, which is located on the mobile device 401, this functionality may also be alternatively, partially or collectively, located within the peripheral device 427. In other words either the peripheral device 427 or the mobile device 401 may contain some of, all of, or various components of, the logic and other functionality described with respect to FIG. 4 and would still remain in accordance with the embodiments herein disclosed. In other words, an apparatus in accordance with the embodiments may be the apparatus 400, or may be the mobile device 401 individually, or the peripheral device 427 individually. Furthermore, interoperability logic 408 may be distributed among the various operating system environments 407 as shown in FIG. 4, or may be independent from the operating system environments 407, or may be integrated into the common kernel 405 in some embodiments.

As mentioned briefly above, in some embodiments, the apparatus 400 may include the peripheral device 427 which may further have a docking station, such that the mobile device 401 may be docked within the peripheral device 427 and obtain the benefit of the larger display 425 as well as other possible peripheral functions. One example of such an apparatus is the Motorola Lapdock™ product.

Although the communication bus 429, which may be any appropriate interface, is shown connected directly to the larger display 425, it is to be understood that various other hardware and components may exist in the peripheral device intervening between the hardware 419 and the display 425. In other words, FIG. 4 is a diagram provided as an example that is not to be construed as a complete schematic diagram of a particular implementation of either a mobile device or the peripheral device. FIG. 4 is an example only and is for the purpose of describing to those of ordinary skill how to make and use the various embodiments. Therefore FIG. 4 is limited to showing only those components necessary to describe the features and advantages of the various embodiments to those of ordinary skill. It is to be understood that various other components, circuitry, and devices may be necessary in order to implement a complete functional apparatus and that those various other components, circuitry, devices, etc., are understood to be present by those of ordinary skill.

In some embodiments, the interoperability logic 408 may operate at an application service level of the various operating system environments to pass contextual information between the environments. In some cases, providing contextual information may involve extracting and providing file metadata, file extensions, pixel location information, and/or other contextual information, to the operating system environment to cause the receiving operating system environment to make an association of the received data, or data file, with the correct file type. In other words, the interoperability logic 408 informs the receiving operating system environment of the correct file type, or other data type, so that it uses the correct associated application, if appropriate, to for example, open a file. In one example, a document file may be drag-and-dropped from the second operating system environment to the first operating system environment. The first operating system environment will launch an application, for example, "quick office," and open the document. In another example, the user may highlight text in the second operating system environment and drag-and-drop the text into a search bar widget of the first operating system environment. The first operating system environment would correctly interpret the text as a search request for the text. This interoperability provides the advantage of a more seamless operation for the user employing multiple operating system environments.

In one example embodiment, the first operating system environment may be an Android™ operating system environment and the second operating system environment maybe a Linux® based operating system environment. However, any of various operating system environments may be used, that operate with a common kernel in accordance with the embodiments.

Figure 5:
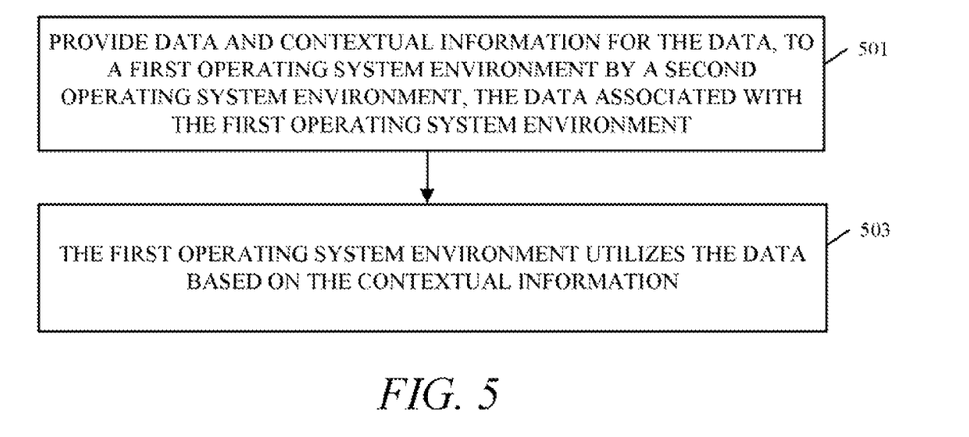
FIG. 5 is flowchart illustrating high level operation of the embodiments.
Figure 6:
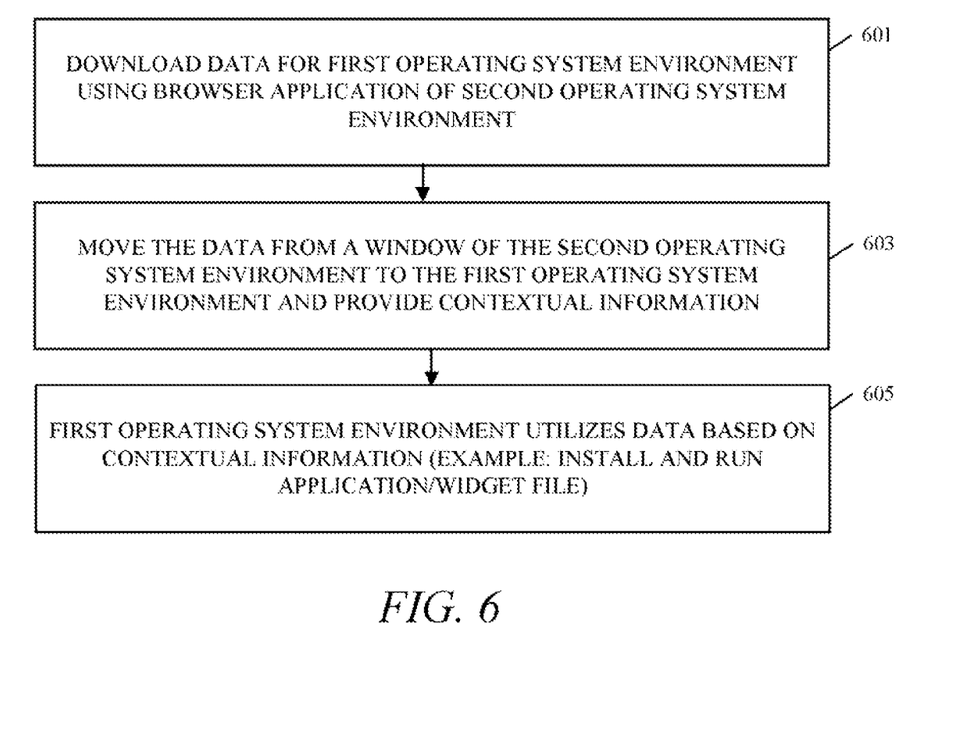
FIG. 6 is a flowchart illustrating details of operation of one embodiment.

FIG. 5 and FIG. 6 are flowcharts that describe high level operation of the various embodiments. In 501, data and contextual information for the data, is provided to a first operating system environment by a second operating system environment. The data is associated with the first operating system environment and may be an application, widget, document, plain text, photograph, video, or any other type of data. In 503, the first operating system environment utilizes the data based on the received contextual information. In FIG. 6, block 601, a browser application of a second operating system environment may be used to download data for a first operating system environment. In 603, the data may be moved from a window, such as the browser window, of the second operating system environment to the first operating system environment along with contextual information for the data. In 605, the first operating system environment utilizes the data based on the contextual information. For example, the first operating system environment may install and run the data as an application or widget.

Figure 7:
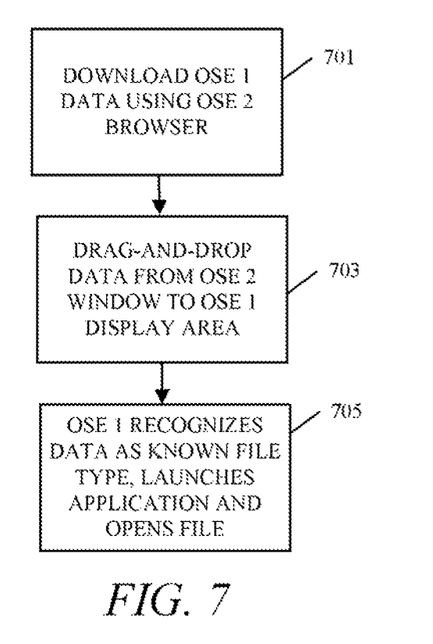
FIG. 7 is a flowchart illustrating recognizing data as a known file type, in accordance with various embodiments.
Figure 8:
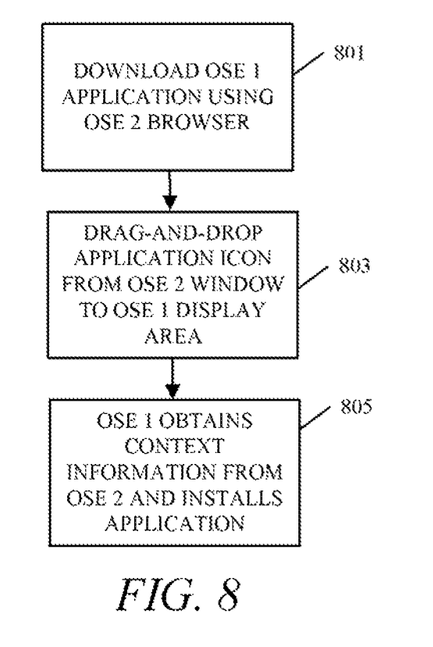
FIG. 8 is a flowchart illustrating recognizing an application file in accordance with various embodiments.
Figure 9:
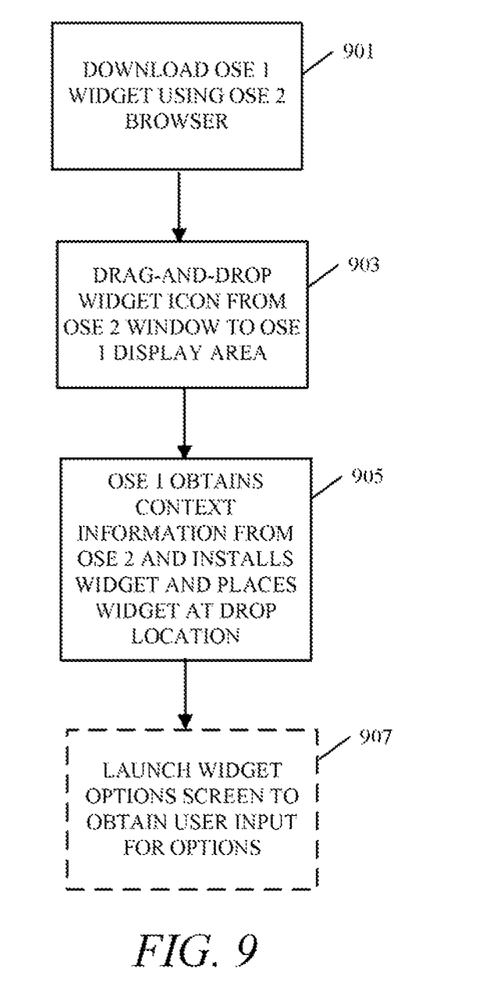
FIG. 9 is a flowchart illustrating recognizing a widget in accordance with various embodiments.

FIG. 7, FIG. 8 and FIG. 9 provide specific operational examples of the various embodiments. In FIG. 7, block 701 a user may download data for the first operating system environment ("OSE 1") using a browser of a second operating system environment ("OSE 2"). The user may then drag-and-drop the data from an OSE 2 window to an OSE 1 display area, such as desktop 303 shown in FIG. 3. OSE 1 will recognize the data as a known file type, launch the appropriate application and open the file. This is because the interoperability logic 408 provided contextual information 410 associated with the data to OSE 1.

In FIG. 8, the user may download an OSE 1 application using an OSE 2 browser. The user may then drag-and-drop the application icon from an OSE 2 window to an OSE 1 display area, such as desktop 303. OSE 1 obtains the contextual information and installs the application accordingly. In FIG. 9, an OSE 2 browser is used to download an OSE 1 widget. The widget may be drag-and-dropped from an OSE 2 window to the OSE 1 desktop 303. OSE 1 obtains contextual information from the interoperability logic of OSE 2 and installs the widget at the drop location on the desktop 303. In some cases, OSE 1 will also launch a widget options screen, or window, to obtain user input for the options as shown in 907.

Among other advantages of various embodiments disclosed herein, the user experience is enhanced when accessing application data or other data using one or more operating system environments. Using the embodiments, such data may be passed from one operating system environment to another, and be understood by the receiving operating system environment. Although the embodiments have been described using examples related to two operating system environments, the various embodiments are not limited to only two operating system environments and can incorporate many operating system environments as illustrated by the plurality of operating system environments 407 shown in FIG. 4. Therefore the interoperability logic 408, in accordance with the embodiments, may handle providing contextual information 410 between any number of operating system environments, where the operating system environments all utilize the common kernel 405.

The various embodiments also include computer readable memory that may contain executable instructions, for execution by at least one processor, that when executed, cause the at least one processor to operate in accordance with the interoperability logic 408 functionality herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices or electronic devices such as those that may benefit from the features of the herein described embodiments. The executable instructions may also include the various operating system environments and the common kernel.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   receiving user interface input indicating movement of an icon corresponding to a graphical user interface representation of data to a first graphical user interface associated with a first operating system environment from a second graphical user interface associated with a second operating system environment, the first and second operating system environments being independent from each other and both utilizing a common kernel;
   providing the data corresponding to the user interface representation and contextual information for the data, to the first operating system environment by the second operating system environment in response to the received user interface input; and
   utilizing the provided data, by the first operating system environment, based on the contextual information.

2. The method of claim 1, wherein utilizing the data comprises:
   installing the data as an application file by the first operating system environment, the first operating system environment being informed by the contextual information, that the data is the application file.

3. The method of claim 1, comprising:
   obtaining the data corresponding to the graphical user interface representation by downloading the data via a browser application of the second operating system environment.

4. The method of claim 3, wherein downloading the data via a browser application of the second operating system environment, comprises:
   downloading an application file associated with the first operating system environment, via a browser application of the second operating system environment.

5. The method of claim 1, wherein providing the data comprises:
   moving the data, in response to the user interface input, from the second operating system environment to the first operating system environment and providing the contextual information for the data in response to moving the data.

6. The method of claim 5, wherein the user interface input comprises drag-and-drop selection input from the second graphical user interface to the first graphical user interface, and moving the data, in response to the user interface input, comprises:
   moving the icon associated with the data from the second graphical user interface to the first graphical user interface, in response to the drag-and-drop selection input.

7. The method of claim 5, wherein the user input comprises cut and paste selection input from the second graphical user interface to the first graphical user interface, and moving the data, in response to the user interface input, comprises:
   moving the data, in response to the cut and paste selection input.

8. The method of claim 1, comprising:
   displaying, on a display, at least one application window corresponding to the second graphical user interface, and the least one icon corresponding to the graphical user interface representation located within the at least one application window, the icon selectable by drag-and-drop selection input; and
   providing the data, and the contextual information for the data, to the first operating system environment in response to drag-and-drop selection input to drag-and-drop the icon from the at least one application window to a desktop of the first operating system environment corresponding to the first graphical user interface.

9. An apparatus comprising:
at least one programmable processor; and
memory operatively coupled to the programmable processor, the memory containing executable instructions for execution by the programmable processor, where upon executing the executable instructions the programmable processor is operative to:
provide a first graphical user interface associated with a first operating system environment and at least a second graphical user interface associated with a second operating system environment, the first and second operating system environments being independent from each other, both operating system environments utilizing a common kernel,
wherein the second operating system environment is operative to receive user interface input indicating movement of an icon corresponding to a graphical user interface representation of data to the first graphical user interface from the second graphical user interface and to provide the data corresponding to the graphical user interface representation and contextual information for the data, to the first operating system environment, the data associated with the first operating system environment, and where the first operating system environment is operative to utilize the provided data based on the contextual information.

10. The apparatus of claim 9, where the first operating system environment is operative to utilize the data by installing the data as an application file, the first operating system environment being informed by the contextual information, that the data is the application file.

11. The apparatus of claim 9, where the second operating system environment is operative to obtain the data associated with the first operating system environment by downloading the data via a browser application of the second operating system environment.

12. The apparatus of claim 11, where the second operating system environment is operative to download the data as an application file associated with the first operating system environment, via the browser application.

13. The apparatus of claim 9, where the programmable processor is operative to provide the data by moving the data, in response to the user interface input, from the second operating system environment to the first operating system environment and provide the contextual information for the data in response to moving the data.

14. The apparatus of claim 13, where the programmable processor is operative to move the data, in response to the user interface input, by moving the icon in response to drag-and-drop selection input from the second graphical user interface to the first graphical user interface.

15. The apparatus of claim 13, where the programmable processor is operative to move the data, in response to the user interface input, by moving the data, in response to a cut and paste selection input from the second graphical user interface to the first graphical user interface.

16. The apparatus of claim 9, comprising:
a display, operatively coupled to the at least one programmable processor, the display operative to display at least one application window corresponding to the second graphical user interface, and the icon corresponding to the graphical user interface representation located within the at least one application window, the icon selectable by drag-and-drop selection input; and
where upon executing the executable instructions the programmable processor is further operative to provide the data, and the contextual information for the data, to the first operating system environment in response to drag-and-drop selection input to drag-and-drop the icon from the at least one application window to a desktop of the first operating system environment corresponding to the first graphical user interface.

17. A computer readable, non-volatile, non-transitory memory, comprising:
executable instructions for execution by at least one processor, that when executed cause the at least one processor to:
provide a first graphical user interface associated with a first operating system environment and at least a second graphical user interface associated with a second operating system environment, the first and second operating system environments being independent from each other, both operating system environments utilizing a common kernel,
wherein the second operating system environment is operative to receive user interface input indicating movement of an icon corresponding to a graphical user interface representation of data to the first graphical user interface from the second graphical user interface and to provide the data corresponding to the graphical user interface representation and contextual information for the data, to the first operating system environment, the data associated with the first operating system environment, and where the first operating system environment is operative to utilize the data based on the contextual information.

18. The computer readable, non-volatile, non-transitory memory, of claim 17, wherein the executable instructions, when executed, further cause the first operating system environment to utilize the data by installing the data as an application file, the first operating system environment being informed by the contextual information, that the data is the application file.

19. The computer readable, non-volatile, non-transitory memory, of claim 17, wherein the executable instructions, when executed, further cause the second operating system environment to obtain the data associated with the first operating system environment by downloading the data via a browser application of the second operating system environment.

20. The computer readable, non-volatile, non-transitory memory, of claim 17, wherein the executable instructions, when executed, further cause the second operating system environment to download the data as an application file associated with the first operating system environment, via a browser application; and
move the application file, in response to the user interface input, from the second operating system environment to the first operating system environment and provide the contextual information for the data in response to moving the data.

* * * * *